US011921911B2

United States Patent
Volos et al.

(10) Patent No.: US 11,921,911 B2
(45) Date of Patent: Mar. 5, 2024

(54) PERIPHERAL DEVICE

(71) Applicant: Microsoft Technology Licensing, LLC, Redmond, WA (US)

(72) Inventors: Stavros Volos, Cambridge (GB); David Thomas Chisnall, Cambridge (GB); Saurabh Mohan Kulkarni, Redmond, WA (US); Kapil Vaswani, Bangalore (IN); Manuel Costa, Cambridge (GB); Samuel Alexander Webster, Cambridge (GB); Cédric Alain Marie Fournet, Cambridge (GB); Richard Osborne, Bristol (GB); Daniel John Pelham Wilkinson, Bristol (GB); Graham Bernard Cunningham, Chippenham (GB)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 17/374,942

(22) Filed: Jul. 13, 2021

(65) Prior Publication Data
US 2021/0342492 A1 Nov. 4, 2021

Related U.S. Application Data

(63) Continuation of application No. 16/166,047, filed on Oct. 19, 2018, now Pat. No. 11,126,757.

(51) Int. Cl.
*H04L 29/00* (2006.01)
*G06F 21/60* (2013.01)
(Continued)

(52) U.S. Cl.
CPC ............ *G06F 21/85* (2013.01); *G06F 21/602* (2013.01); *H04L 9/30* (2013.01); *H04L 9/3265* (2013.01)

(58) Field of Classification Search
CPC ........ G06F 21/85; G06F 21/602; G06F 21/64; G06F 21/57; H04L 9/30; H04L 9/3265; H04L 9/0825
See application file for complete search history.

(56) References Cited

U.S. PATENT DOCUMENTS 8,938,723 B1 1/2015 Tormasov et al.
9,703,981 B1 * 7/2017 Marion ................. H04W 12/06
(Continued)

OTHER PUBLICATIONS

"Non Final Office Action Issued in U.S. Appl. No. 16/023,965", dated Dec. 9, 2021, 15 Pages.
(Continued)

*Primary Examiner* — Ghazal B Shehni
(74) *Attorney, Agent, or Firm* — Barta Jones, PLLC

(57) ABSTRACT

A peripheral device, for use with a host, comprises one or more compute elements a security module and at least one encryption unit. The security module is configured to form a trusted execution environment on the peripheral device for processing sensitive data using sensitive code. The sensitive data and sensitive code are provided by a trusted computing entity which is in communication with the host computing device. The at least one encryption unit is configured to encrypt and decrypt data transferred between the trusted execution environment and the trusted computing entity via the host computing device. The security module is configured to compute and send an attestation to the trusted computing entity to attest that the sensitive code is in the trusted execution environment.

19 Claims, 10 Drawing Sheets

(51) Int. Cl.
*G06F 21/85* (2013.01)
*H04L 9/30* (2006.01)
*H04L 9/32* (2006.01)

(56) References Cited

U.S. PATENT DOCUMENTS

| | | |
|---|---|---|
| 10,339,082 B2 | 7/2019 | Xing et al. |
| 10,367,639 B2 | 7/2019 | Vembu et al. |
| 11,018,863 B2 | 5/2021 | Vembu et al. |
| 11,630,904 B2 | 4/2023 | Pappachan et al. |
| 2003/0140241 A1 | 7/2003 | England et al. |
| 2003/0200435 A1 | 10/2003 | England et al. |
| 2004/0109563 A1 | 6/2004 | Evans et al. |
| 2004/0111627 A1 | 6/2004 | Evans et al. |
| 2007/0081670 A1* | 4/2007 | Topham ............... H04L 9/0637 380/239 |
| 2007/0276756 A1* | 11/2007 | Terao ............... G11B 20/0021 |
| 2010/0146501 A1 | 6/2010 | Wyatt et al. |
| 2014/0082749 A1* | 3/2014 | Holland ............... G06F 21/60 726/29 |
| 2014/0355754 A1* | 12/2014 | Leung ............... H04L 9/065 380/28 |
| 2016/0371496 A1 | 12/2016 | Sell |
| 2017/0024584 A1 | 1/2017 | Chhabra et al. |
| 2018/0139194 A1 | 5/2018 | Poornachandran et al. |
| 2018/0204025 A1 | 7/2018 | Chhabra et al. |
| 2018/0212939 A1 | 7/2018 | Costa |
| 2018/0212940 A1 | 7/2018 | Novak |
| 2018/0240100 A1 | 8/2018 | Leleu |
| 2018/0241547 A1 | 8/2018 | Kim et al. |
| 2018/0287792 A1* | 10/2018 | Fu ............... H04L 9/0822 |
| 2018/0351836 A1 | 12/2018 | Guim Bernat et al. |
| 2019/0042766 A1 | 2/2019 | Pappachan et al. |
| 2019/0116108 A1* | 4/2019 | Gibson ............... H04L 43/0876 |
| 2019/0163657 A1 | 5/2019 | Xing et al. |
| 2019/0278913 A1 | 9/2019 | Ndu et al. |
| 2019/0327077 A1 | 10/2019 | Mandal et al. |
| 2019/0377503 A1 | 12/2019 | Schluessler et al. |
| 2020/0257794 A1 | 8/2020 | Kim et al. |
| 2021/0240637 A1 | 8/2021 | Goss et al. |
| 2022/0092135 A1 | 3/2022 | Sidman |
| 2022/0206946 A1 | 6/2022 | Potter et al. |
| 2023/0073426 A1 | 3/2023 | Volos et al. |

OTHER PUBLICATIONS

"Notice of Allowance Issued in U.S. Appl. No. 16/023,965", dated May 4, 2022, 8 Pages.
"Office Action Issued in European Patent Application No. 19769695.8", dated Aug. 12, 2022, 4 Pages.
"Office Action Issued in India Patent Application No. 202017054653", dated Sep. 9, 2022, 8 Pages.
"Final Office Action Issued in U.S. Appl. No. 16/023,965", dated Sep. 1, 2021, 14 Pages.
"Office Action Issued in Indian Patent Application No. 202117017040", dated Nov. 24, 2022, 7 Pages.
"Office Action Issued in Japanese Patent Application No. 2021-521344", dated Sep. 4, 2023, 7 Pages.
Schear, et al., "Bootstrapping and Maintaining Trust in the Cloud", In Proceedings of the 32nd Annual Conference on Computer Security Applications, Dec. 5, 2016, pp. 65-77.
"Notice of Allowance Issued in U.S. Appl. No. 17/898,035", dated Jul. 13, 2023, 12 Pages.
Jang, et al., "SeCReT: Secure Channel between Rich Execution Environment and Trusted Execution Environment", In Proceedings of NDSS Symposium, Feb. 8, 2015, 15 Pages.

* cited by examiner

PERIPHERAL DEVICE

BACKGROUND

Peripheral devices such as graphics processing units, field-programmable gate arrays (FPGAs), application-specific integrated circuits, cryptographic accelerators, video processing units, regular expression accelerators, data compression accelerators, artificial intelligence accelerators and others are increasingly widely used to complement a central processing unit (CPU) of a host. Peripheral devices which comprise computer hardware to perform functions more efficiently than is possible in software running on a general-purpose CPU are often very useful units, separate from the CPU which act as hardware accelerators. Typically these types of peripheral device improve the execution of specific types of algorithm by allowing greater concurrency. Peripherals are also used to give higher reliability and different security options.

Increasingly there is a desire to work with sensitive code and or sensitive data and to retain security and privacy. Often large amounts of sensitive code and or data are to be processed using resource intensive algorithms and peripheral devices are an option to improve efficiency in such situations. However, where peripheral devices are used additional challenges are introduced regarding security and privacy of sensitive code and/or data since there is both a host and a peripheral device and often the host itself is untrusted. The sensitive code and sensitive data reaches the peripheral device via the host and so an attacker is potentially able to obtain the sensitive information from the untrusted host.

The embodiments described below are not limited to implementations which solve any or all of the disadvantages of known peripheral devices.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

In various examples there is a peripheral device for use with a host computing device, the peripheral device comprising one or more compute elements a security module and at least one encryption unit. The security module is configured to form a trusted execution environment on the peripheral device for processing sensitive data using sensitive code. The sensitive data and sensitive code are provided by a trusted computing entity which is in communication with the host computing device. At least one encryption unit is configured to encrypt and decrypt data transferred between the trusted execution environment and the trusted computing entity via the host computing device. The security module is configured to compute and send an attestation to the trusted computing entity to attest that the sensitive code is in the trusted execution environment.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
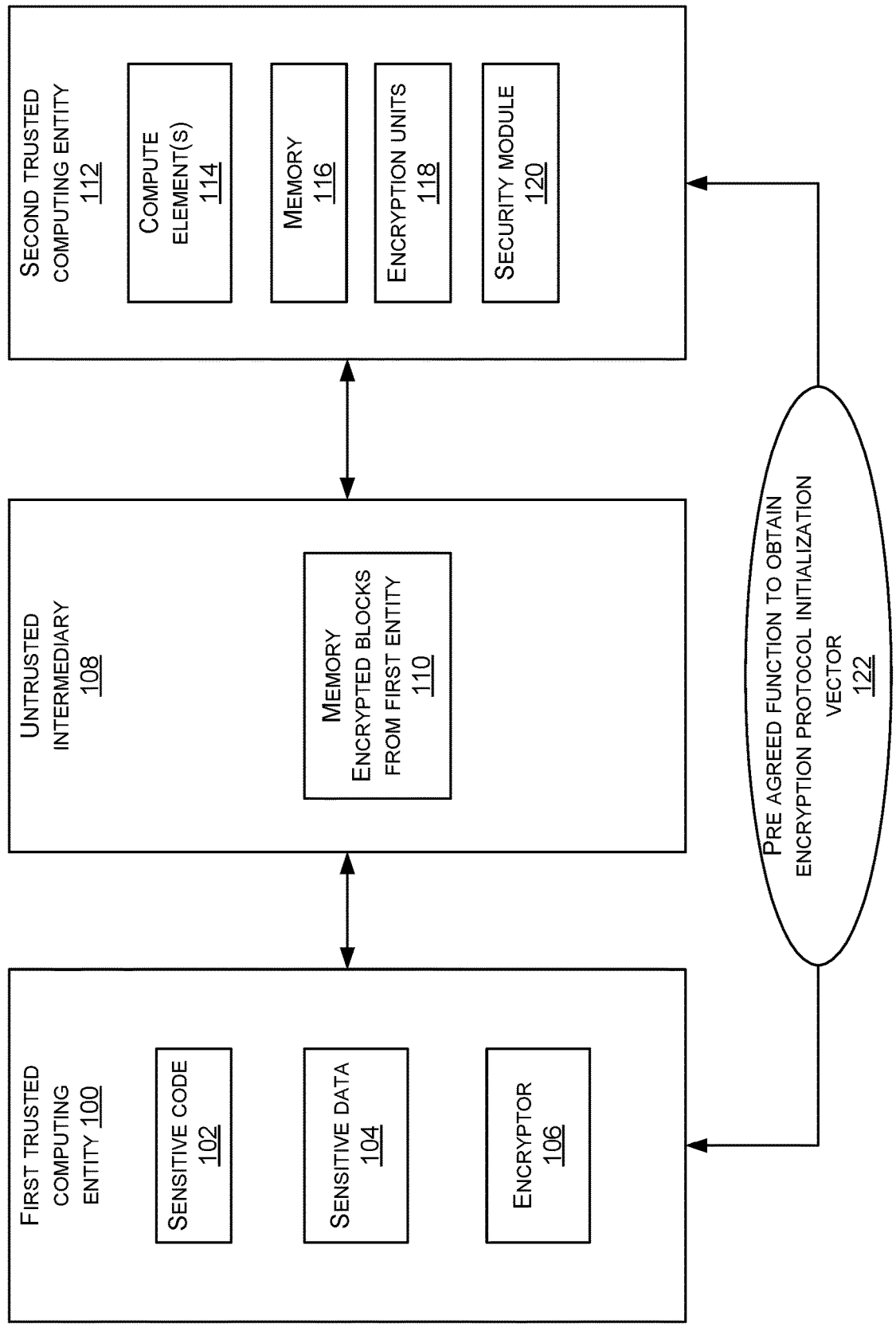
FIG. 1 is a schematic diagram of a first trusted computing entity, an untrusted intermediary, and a second trusted computing entity.

The detailed description provided below in connection with the appended drawings is intended as a description of the present examples and is not intended to represent the only forms in which the present examples are constructed or utilized. The description sets forth the functions of the example and the sequence of operations for constructing and operating the example. However, the same or equivalent functions and sequences may be accomplished by different examples.

In various examples described herein, a peripheral device is used together with a host computing device. The host computing device is not trusted and is potentially malicious. A tenant is any computing device in communication with the host computing device and which has access to code that the tenant wants to execute on the peripheral. In some examples the tenant has sensitive code to be executed on the peripheral device in order to process sensitive data. In some examples, one or more other tenants are also using the peripheral device, but this is not essential. In an example the sensitive code implements training or inference for a neural network or other machine learning algorithms and the sensitive data is training data. The machine learning model is trained on the peripheral device and the resulting trained model parameters are returned to the tenant from the peripheral after training. The model may also stay in the peripheral device to be used for inference after training. However, the technology is not limited to machine learning applications and any sensitive code and sensitive data is used. In some examples, one or both of the code and data are not sensitive.

In order for the sensitive code to be executed on the peripheral device it is to be transferred to the peripheral via the host since input to the peripheral device is via the host. Once at a peripheral device, the sensitive code may be transferred to other peripheral devices of the same host. However, transferring sensitive code to the peripheral via the host is not straightforward since the host computing device is potentially malicious. The sensitive data is also to be transferred to the peripheral and again, this is problematic where the host computing device is potentially malicious. The tenant does not trust the host computing device and so, even when the sensitive code has been transferred to the peripheral, the tenant is not sure that the sensitive code is still confidential or whether the host has tampered with the sensitive code or replaced it with other code. The sensitive data passes through the host and is potentially compromised by the untrusted host.

In some cases an attacker has privileged access to the host computing device, for example, where the attacker is an administrator of the host operating system, or has administrator privileges for applications or services in the host operating system. In some cases, an attacker is a hacker which exploits a vulnerability in an operating system of the host computing device, a hypervisor on the host computing device or another privileged execution mode of the host computing devices). In some cases, the attacker has physical access to the host computing device and the peripheral device and optionally, is able to probe and tamper with connections between components in the peripheral. The attacker may be a board-level adversary taking the peripheral out of thermal, power, or clock limits to induce bit flips.

In various examples, the tenant is a computing device referred to as a client, which is in communication with the host computing device over any suitable communications network. The peripheral device is in the host computing device or connected to the host computing device. By careful design of the peripheral device as described herein, it is possible to create a trusted execution environment (TEE) on the peripheral device for executing the sensitive code and processing the sensitive data. In some examples the TEE is designed to be secure against the untrusted host and attacker which potentially has physical access to the peripheral as mentioned above.

Design of the peripheral device is described at least with reference to FIG. 4 and FIGS. 5A to 5C below and creation of the TEE is described at least with reference to FIG. 6. In some examples, the peripheral is configured to attest to the tenant that the sensitive code is installed on the peripheral as expected by the tenant. An example attestation process of the peripheral device is described at least with reference to FIG. 7.

There is a key exchange process such as described with reference to FIG. 8. The key exchange process is useful for secure communication between the tenant and the peripheral. In some cases the key exchange process is used to enable sensitive data from more than one party to be processed at the peripheral and kept confidential between the parties. A party is a tenant in some examples. However, in some cases a party does not have access to code to be executed on the peripheral. Where the peripheral is one which supports resource isolation, the key exchange process is useful to enable more than one tenant to use the same peripheral for executing different sensitive code and sensitive data, whilst retaining confidentiality between the tenants. In some examples, a plurality of tenants and/or parties agree on the same code and then they send different data sets to the peripheral.

In some examples there is an encryption protocol which enables efficient, secure transfer of sensitive data between two trusted entities via an untrusted intermediary. An example of the encryption protocol is described with reference to FIG. 9 and it is applicable for the case where one of the trusted entities is the tenant, the other trusted entity is the peripheral and the untrusted intermediary is the host. However, note that the encryption protocol is broadly applicable beyond the tenant and hosted peripheral situation. The encryption protocol is workable for secure transfer of sensitive data between any first trusted entity and any second trusted entity, via any untrusted intermediary. The first and second trusted entities are nodes in a telecommunications network in some cases and the untrusted intermediary is a router, switch or proxy in the telecommunications network. The first and second trusted entities are a home personal computer and an internet service provider server in some examples and the untrusted intermediary is a home wireless access point. In some examples the untrusted intermediary is a wireless hotspot device and the trusted first entity is a smart phone and the trusted second entity is a web server.

A security module at the second trusted entity operates in an unconventional manner to achieve dynamic creation of a trusted execution environment at the second trusted entity. The security module operates in an unconventional manner to achieve secure and efficient communication between its trusted execution environment and a trusted first entity via an untrusted intermediary.

The security module at the second trusted entity improves the functioning of the underlying peripheral device by creating a trusted execution environment at the peripheral device.

Figure 9:
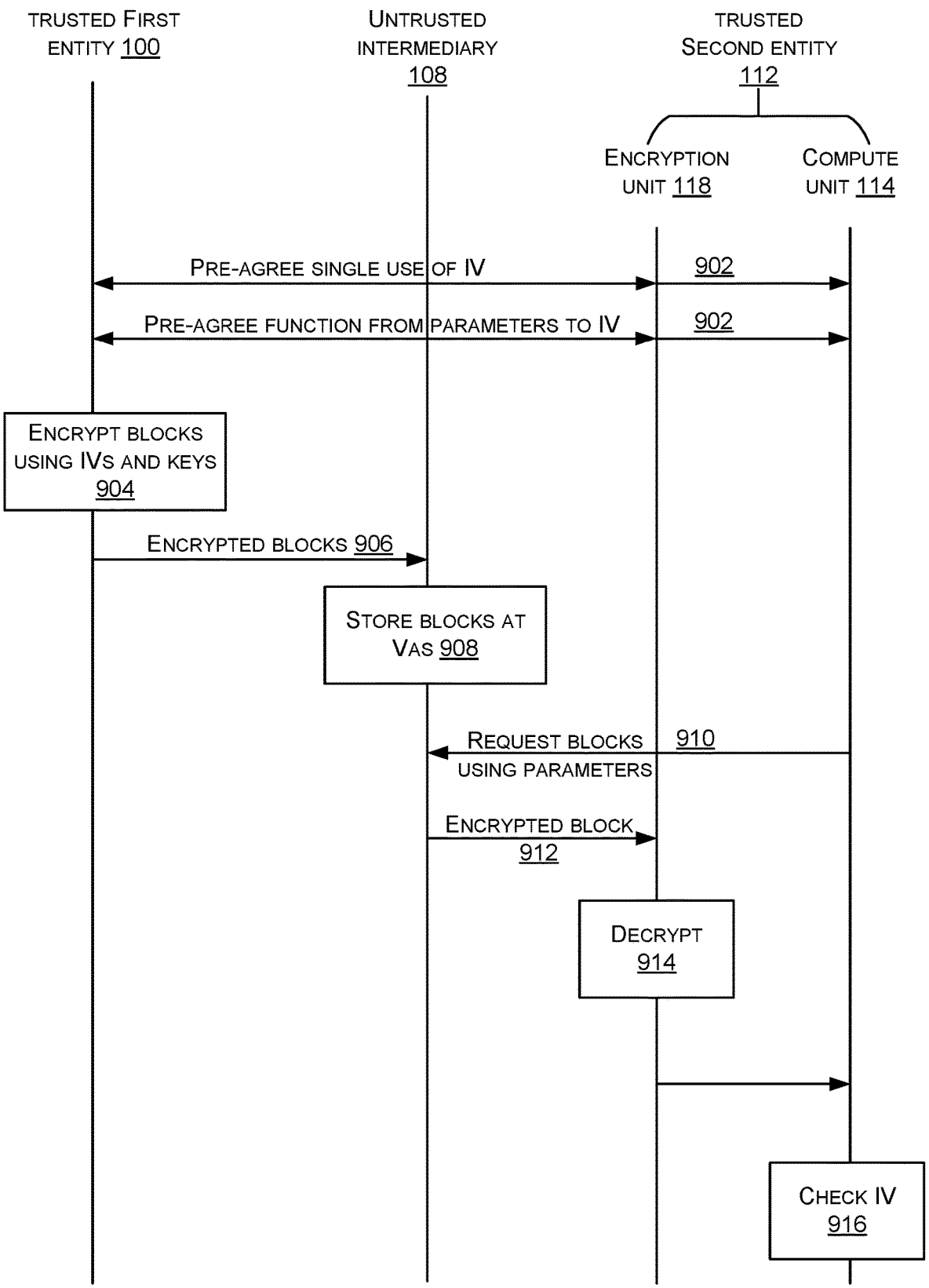
FIG. 9 is a message sequence chart of an encryption protocol used by the first trusted entity and the second trusted entity of FIG. 1.

FIG. 1 shows three high level entities: a first trusted computing entity 100, an untrusted intermediary 108 and a second trusted computing entity 112. In most of the examples described herein the first trusted computing entity 100 is a tenant and the second trusted computing entity 112 is a peripheral of the untrusted intermediary 108. However, as mentioned above, the encryption protocol described with reference to FIG. 9 is applicable more broadly to the three high level entities shown in FIG. 1. The first trusted computing entity is any computing device, or trusted execution environment, which is able to store sensitive code 102, store sensitive data 104, encrypt 106 sensitive code and/or sensitive data, and to communicate with the untrusted intermediary 108. In some examples the first trusted computing entity is a trusted execution environment on the untrusted intermediary 108. The encryptor 106 of the first trusted entity does both encryption and decryption of sensitive information.

The untrusted intermediary 108 is any computing device with a memory 110 and which is able to receive encrypted data from the first trusted computing entity 100 and which is in communication with a second trusted computing entity via a communications network or link. The memory 110 (which is any type of memory 110) stores at least encrypted blocks of code and/or data from the first trusted computing entity.

The second trusted computing entity 112 is any computing device which is able to isolate itself in a way so as to create a trusted execution environment for processing sensitive data using sensitive code. The second trusted computing entity 112 has one or more compute elements 114 for processing sensitive data using sensitive code. The compute elements 114 are processors, parallel compute units or other compute elements. The second trusted computing entity 112 has a memory 116 which is shared by the compute elements 114 and it has one or more encryption units 118. Each encryption unit 118 is able to encrypt and to decrypt information. A security module 120 of the second trusted computing entity 112 controls processes to create the trusted execution environment and to provide an attestation to the first computing entity, attesting to one or more states at the second trusted computing entity 112. A non-exhaustive list of states to be attested to at the second trusted computing entity 112 is: that the hardware of the second trusted computing entity 112 is in a certain known state such as with cleared memory, that a specific firmware is installed in the second trusted computing entity 112, that specific sensitive code is installed in the second trusted computing entity 112.

The encryption unit(s) 118 at the second trusted computing entity and the encryptor 106 at the first trusted computing entity are both configured to use an encryption protocol for encrypting blocks of sensitive code and/or data for transfer via the untrusted host. Any encryption protocol is usable which protects the sensitive information from the host by encrypting blocks of sensitive information using keys and initialization vectors. An individual block is encrypted using a pair comprising an initialization vector and a key.

In some examples, the encryption protocol is one which is particularly efficient at securely managing initialization vectors of the encryption protocol. The encryption protocol involves the first and second trusted computing entities pre-agreeing 122 on a parameterized function for obtaining the initialization vectors in an efficient manner. The parameterized function computes pairwise-distinct initialization vectors for encryption and for decryption of each block of sensitive information. Conversely, using the same initialization vector for different blocks of sensitive information may compromise their integrity and confidentiality. Using different initialization vectors for the same block of sensitive information leads to decryption errors as explained in more detail later in this document.

Although the example in FIG. 1 shows a single untrusted intermediary 108 and a single second trusted computing entity 112 it is also possible to have multiple such entities. In some examples, each untrusted intermediary 108 has multiple second trusted computing entities 112 connected to it and the second trusted computing entities 112 are able to communicate with one another. In some examples, there are multiple untrusted intermediaries 108 which are optionally able to communicate with one another. The technology thus scales up to rackscale scenarios where there are racks of untrusted intermediaries 108, each of which is responsible for a plurality of second trusted computing entities 112, which are able to communicate with one another.

Figure 2:
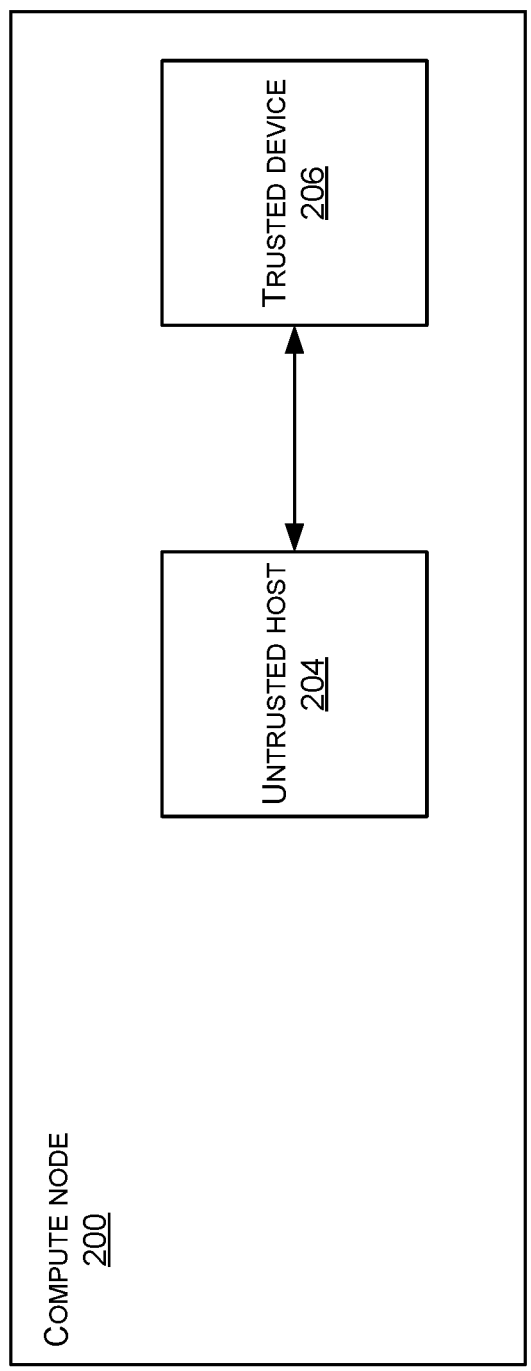
FIG. 2 is a schematic diagram of a compute node.
Figure 3:
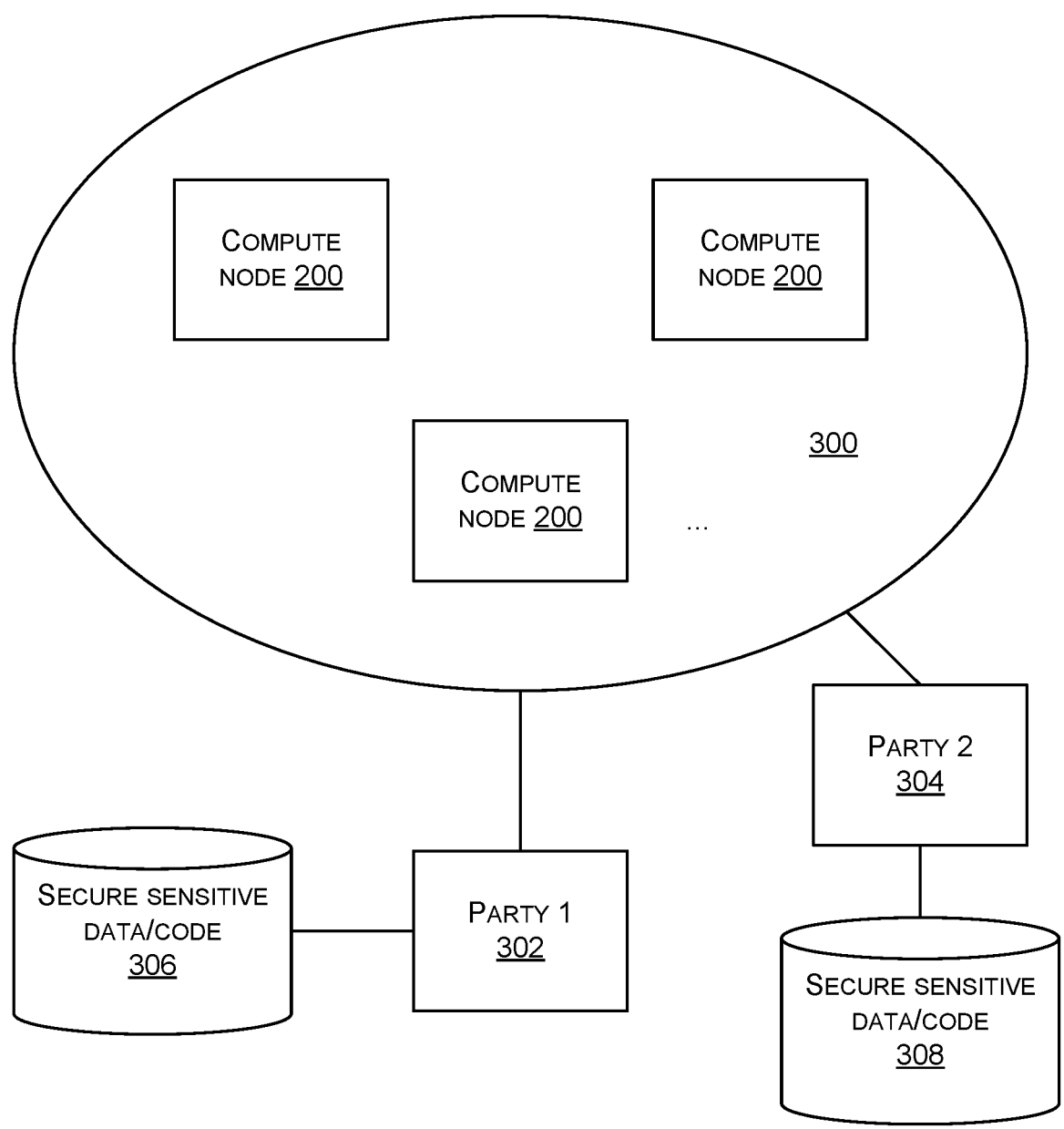
FIG. 3 is a schematic diagram of a data center comprising untrusted host computing devices with trusted peripheral devices.

FIG. 2 is a schematic diagram of a compute node 200 comprising an untrusted host 204 and a trusted peripheral device 206 connected to the untrusted host 204. A plurality of such compute nodes 200 are deployed in a data center 300 as illustrated in FIG. 3 where the compute nodes 200 are interconnected using a communications network within the data center 300 which is not shown in FIG. 3 for clarity. A first tenant 302 comprising a computing device has a secure store 306 of sensitive data and/or code. The first tenant 302 is in communication with the data center 300. The first tenant 302 is able to securely copy the sensitive code to a trusted execution environment on one or more of the trusted peripheral devices of the compute nodes 200 in the data center 300 and to receive an attestation from the peripheral devices that the sensitive code has been installed and the device is in a known state. The first tenant 302 is able to copy the sensitive data to the trusted peripheral devices so that the sensitive data is processed in the trusted execution environment. In some examples, one or more other sources of secure sensitive data also input to the code executing in the trusted execution environment. In this way, data from more than one party is used for machine learning or other processing in the trusted execution environment.

In some examples there is a second tenant 304 comprising a computing device in communication with the data center 300. The second tenant 304 has a secure store 308 of sensitive code and/or data. The second tenant is able to copy the sensitive code and data to one or more of the same peripheral devices in the data center as the first tenant 302. Using resource isolation mechanisms in the peripheral devices, and using separate encryption keys for the individual tenant code and data, it is possible for the confidentiality of the individual tenants to be maintained.

In some examples the second tenant 304 has a secure store 308 of sensitive data which is different from the sensitive data of the first tenant 302. Both the first tenant 302 and the second tenant 304 use the same sensitive code at the same peripheral device and they send their respective different data sets to be processed by the same sensitive code.

FIG. 3 illustrates the situation for a data center. However, it is also possible to use the trusted and untrusted entities of FIG. 1 in stand-alone situations or in other types of deployment. In an example the trusted and untrusted entities of FIG. 1 are used in an edge deployment. Here the first trusted computing entity 100, untrusted intermediary 108 and second trusted computing entity 112 are deployed at the edge of a communications network rather than in the cloud. The first trusted computing entity 100 is physically proximate to a data source such as a capture device or sensor, or has an integral capture device or sensor which produces the sensitive data 104. The first trusted computing entity 100 uses the untrusted intermediary 108 and second trusted computing entity 112 to do machine learning and/or inference near the data stream source such as the capture device or sensor.

Figure 4:
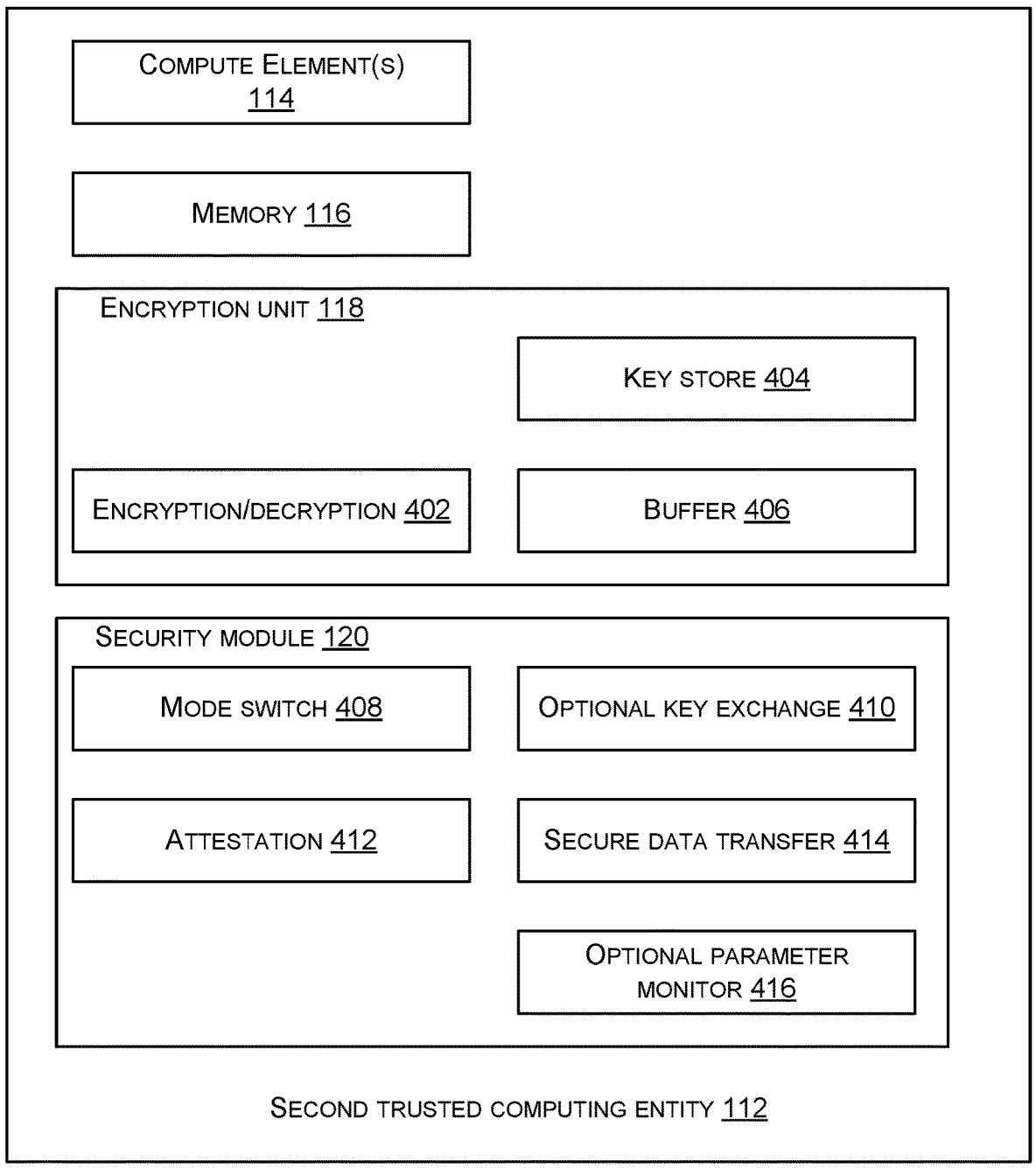
FIG. 4 is a schematic diagram of a peripheral device which is an example of the second trusted computing entity of FIG. 1.

FIG. 4 is a schematic diagram of a second trusted computing entity 112 such as that of FIG. 1. In some examples the second trusted computing entity is a peripheral device of a host computing device but it is not essential.

The second trusted computing entity 112 comprises one or more compute elements 114 and an optional memory 116. The memory 116 is shared by the compute elements or is private to specific computing elements. The second trusted computing entity 112 has at least one encryption unit 118 comprising an encryption/decryption component 402, an optional key store 404 and an optional buffer 406.

The encryption/decryption component 402 is configured to authenticate and decrypt data received from the host and from other peripheral devices via any form of communication. In an example, the communication is made using direct memory access (DMA) requests but it is not essential to use this form of communication. The encryption/decryption component 402 is configured to encrypt data sent to the host via DMA transfer (or other form of communication), or sent to other peripheral devices, using authenticated encryption. In some examples, the encryption/decryption component 402 is a logic block placed on a die of a package where the peripheral is a device package. In other examples the encryption/decryption component is on package, or implements as a software component on a programmable peripheral. The encryption/decryption component 402 is connected to the optional buffer 406 and the buffer 406 is arranged to intercept and buffer communications to and from the host, such as DMA requests and responses. The buffer 406 is connected to the key store 404 which holds expanded encryption keys, and also to a peripheral component interconnect express (PCIe) complex. In some but not all examples the second trusted computing entity supports an unsecure mode of operation. In an unsecure mode of operation of the peripheral device the encryption/decryption component is bypassed.

Using the buffer 406 gives the benefit that more than one DMA request or response may be in flight at any one time. In some cases the buffer 406 is omitted and DMA requests or responses are issued one at a time.

In a particular example, which is not intended to limit the scope of the technology, the encryption/decryption component 402 has support for AES or another encryption scheme, supports multiple key contexts, has an interface for specifying an authentication tag to be checked when an encrypted data stream ends and for retrieving an authentication tag when a cleartext data stream ends.

A security module 120 in the second trusted computing entity 112 has an optional mode switch 408 (used where the second trusted computing entity 112 supports an insecure mode), an attestation component 412, an optional key exchanger 410, a secure data transfer component 414 and an optional parameter monitor 416. The security module is a logic block integrated with the peripheral device package. In one example the security module is a system on a chip (SoC) with a microcontroller, a static random-access memory (SRAM) for code and data, and a read-only memory (ROM) to hold initial boot block for the microcontroller. However, other implementations of the security module are possible. The security module 120 contains logic blocks or software for operations such as symmetric key authenticated encryption and decryption, secure hash computation, public key generation, signing and authentication, and an entropy source. The security module 120 is connected to other components of the peripheral using any suitable connectors.

The security module 120 is configured to initialize the peripheral into a clean state and orchestrate encryption and decryption of data transfers between the host and the peripheral device and between peripheral devices. The security module 120 contains a root endorsement key which is either burnt into fuses of the security module 120 or generated using hardware of the security module 120. The root endorsement key serves as a root of trust suitable for generating attestation keys for validation using a trusted certification authority.

The mode switch 408 is arranged to switch the peripheral device between a non-secure mode in which sensitive memory and sensitive registers of the peripheral device are accessible by entities external to the peripheral device, and a secure mode in which the sensitive memory and sensitive registers of the peripheral device are not accessible by entities external to the peripheral. During the secure mode, the security module configures the peripheral to enforce a device—specific access control list preventing the untrusted intermediary from accessing unsafe functionality. During the secure mode, DMA and peripheral device to peripheral device communication is routed through the encryption unit(s) 118.

In some examples there are one or more registers where access is to be authenticated, such as a register which contains an address of sensitive code to be launched on the peripheral. Accesses to these registers is routed to the security module which authorizes access and invokes peripheral functionality through a different interface. The registers where access is to be authenticated are exposed by the peripheral and served by the security module.

The optional key exchanger 410 is arranged to configure the encryption units 118 with keys.

The security module 120 has an attestation component 412 for measurement of application code running on the compute unit(s), generation of quotes for remote attestation, and key exchange. A quote is data which acts as a certificate issued by the peripheral device for remote attestation whereby the tenant is able to verify one or more security critical properties of the peripheral device. A quote captures security critical properties of the peripheral. In an non-limiting example, the quote is computed as a hash.

The security module 120 has a secure data transfer component 414 which generates DMA requests to transfer data from the host into security module memory, such as SRAM or other memory, either directly or indirectly.

The optional parameter monitor 416 is arranged to monitor thermal, power and clock parameters of the security module 120. The parameter monitor 416 is arranged to issue a reset if one or more of the parameters goes out of a safe range and to hold a reset line until the security module 120 receives notification that the peripheral device has been completely reset. The reset state is held in memory on the security module 120 and logic for sending the reset is implemented using either software or using a hardware state machine. The security module 120 uses a dynamic random-access memory (DRAM) word with parity bits and on-die temperature sensors to check if the peripheral device is being operated out of specified power and temperature ratings.

The identity of a second trusted computing entity 112 is based on an endorsement key, which, where the second trusted computing entity 112 is a device package comprising a chip, is created or provisioned on the chip during manufacturing. The private endorsement key never leaves the chip, and the public key is used for attestation and is referred to as an attestation key. There are different ways of provisioning an endorsement key that vary in complexity and security and two of these ways are now described.

In a first method, a manufacturer of the trusted second entity has a facility for securely generating endorsement key pairs, burning the private endorsement key into fuses in each device, and provisioning certificates for the public keys to a trusted certification authority. A drawback of this approach is that the manufacturer has access to the private endorsement keys. Another drawback is that it introduces complexity and cost for the manufacturer.

In a second method, the endorsement key is generated on the second trusted computing device using a combination of physical unclonable functions (PUFs) and fuzzy extractors. PUFs are based on physical variations which occur naturally during semiconductor manufacturing, and which make it possible to differentiate between otherwise identical semiconductors. With a fuzzy extractor, a PUF will generate the same key every time it is evaluated with a given input. Typically, the PUF will be used during a secure boot process by trusted firmware to first generate the secret key, and then generate and output the corresponding public key. The manufacturer of the trusted second computing device is able to trigger this process for each device and issue certificates for the public keys without having access or having to maintain private keys. Another advantage is that this mechanism enables physical attestation i.e. anyone with physical access to the device (e.g. an auditor) can obtain public keys and issue certificates.

Once the certification authority has received endorsement key certificates, it issues certificates. A relying party uses the certificates to ascertain the integrity of messages from a trusted second computing device. The certification authority also maintains a revocation list that contains devices that have been misplaced, decommissioned or may have been compromised. The certification authority stops issuing certificates for such devices.

An enclave attestation service is available for use by any of the entities in FIG. 1. The enclave attestation service accepts quotes from an enclave, such as a trusted execution environment on the second trusted computing device. The enclave attestation service generates signed tokens that can be forwarded to other services to release secrets. Policies govern the release of secrets. Policies use criteria such as attributes in a quote (such as measurements of the state of the second trusted computing device). The attestation service checks the policies against the quotes. The attestation service supports multiple trust models, such as to trust all quotes from a specified manufacturer, or trust quotes if the service has a valid public endorsement key. The tokens generated by the attestation service are able to carry information about the geographic location of the device in some cases. In some cases PCK certificates are packaged with quotes and forwarded to the attestation service.

There are various different options for where to place the security module 120 in the peripheral device package. In a first option, described with reference to FIG. 5A, the security module 504 is located on the same die 506 as the compute elements 502 and encryption unit(s) 118. The encryption units are not shown in FIG. 5A for clarity and are located with the compute elements 502. The first option has strong security since if an attacker accesses or tampers with secrets within the security module he or she will impair functioning of the whole package. The first option gives good performance due to the security module being on-die.

Figure 5A:
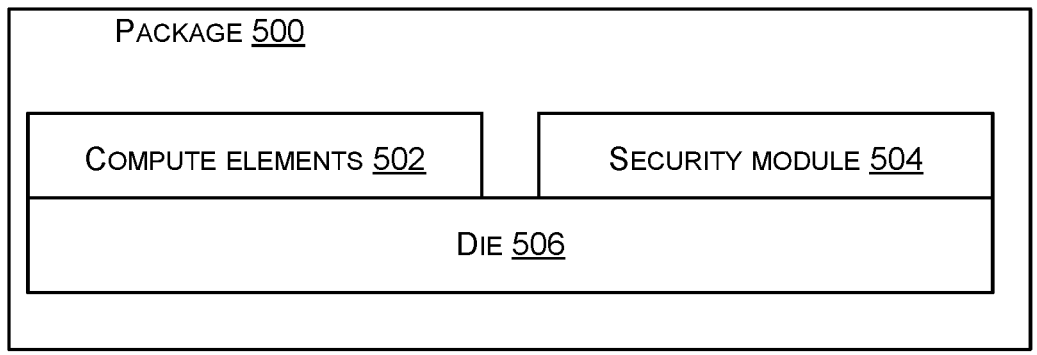
FIG. 5A is a schematic diagram of a peripheral device package with a security module on-die.
Figure 5B:
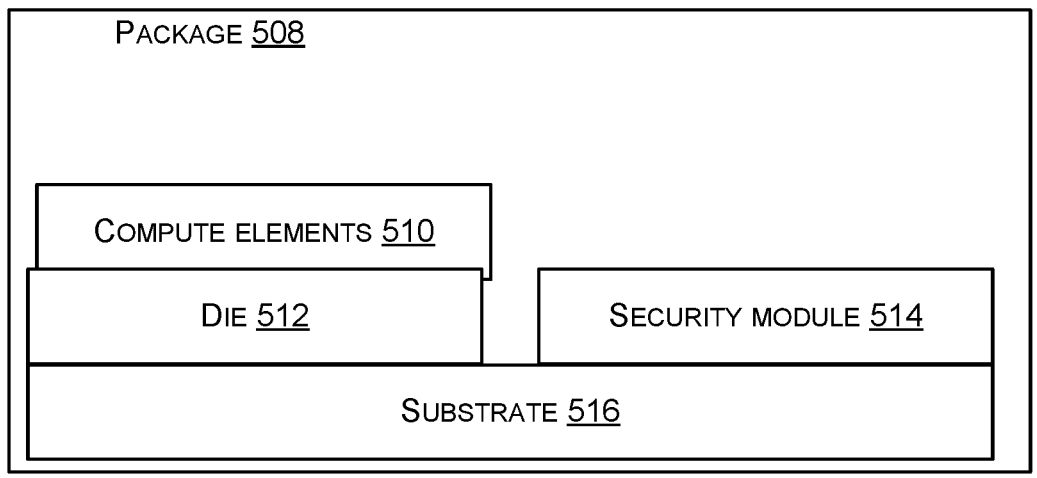
FIG. 5B is a schematic diagram of a peripheral device package with a security module off-die and on-substrate.

A second option is shown in FIG. 5B and comprises integrating the security module 514 in the same multi-chip module as the peripheral package 508. Here the compute elements 510 and encryption units 118 (not shown in FIG. 5B) are on die 512 supported on substrate 516. The security module 514 is on the same substrate 516 as the compute elements 510 but not the same die 512 as the compute elements 510. The second option has slightly weaker security than option one if an attacker has physical access to the peripheral device package 508. However, the second option gives the benefit of decoupling the security module 514 from the other components of the peripheral device and the decoupling facilitates development, design and testing.

Figure 5C:
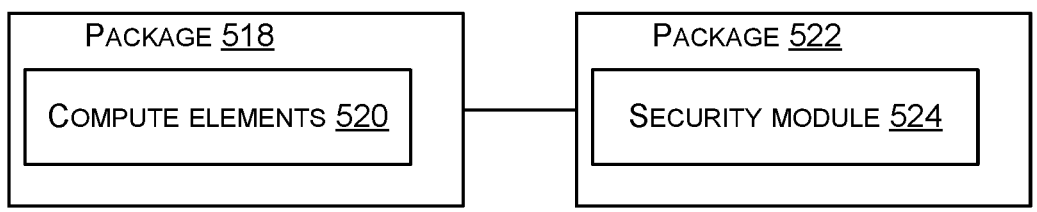
FIG. 5C is a schematic diagram of a peripheral device comprising two packages.

A third option is shown in FIG. 5C and comprises placing the security module 524 off package on a separate chip. In the third option there is a first package 518 comprising the compute elements 520 and the encryption units 118 (not shown in FIG. 5C for clarity). There is also a second package 522 comprising the security module 524. The first and second packages are connected to one another. The third option decouples the security module from the rest of the peripheral device package and so it facilitates fabrication.

Initialization of the second trusted computing device is now described. The security module goes through a boot sequence when the second trusted computing device boots or resets.

During the boot sequence, the security module loads firmware from ROM, checks that the firmware is signed correctly and measures the firmware. The measurements are stored securely within the security module.

The security module firmware is split into two components, (a) a component responsible for critical tasks such as checking signatures, measurement and attestation key generation, and (b) a component responsible for other tasks such as quote generating, and encryption/decryption of direct memory access traffic. The first component is security critical, is as small as possible and rarely changes. The second component does not have write access to secrets such as firmware measurements and private endorsement and attestation keys.

After boot, the security module is requested to generate a fresh attestation key (AK). The corresponding private key AKpriv is stored securely in non-volatile memory in the security module. Alternatively, the attestation key is derived from a PUF using the firmware trusted computing base as the initialization vector. This avoids the need for storing the attestation key. However, this restricts the frequency with which the attestation key can being refreshed to refresh on firmware updates.

Figure 6:
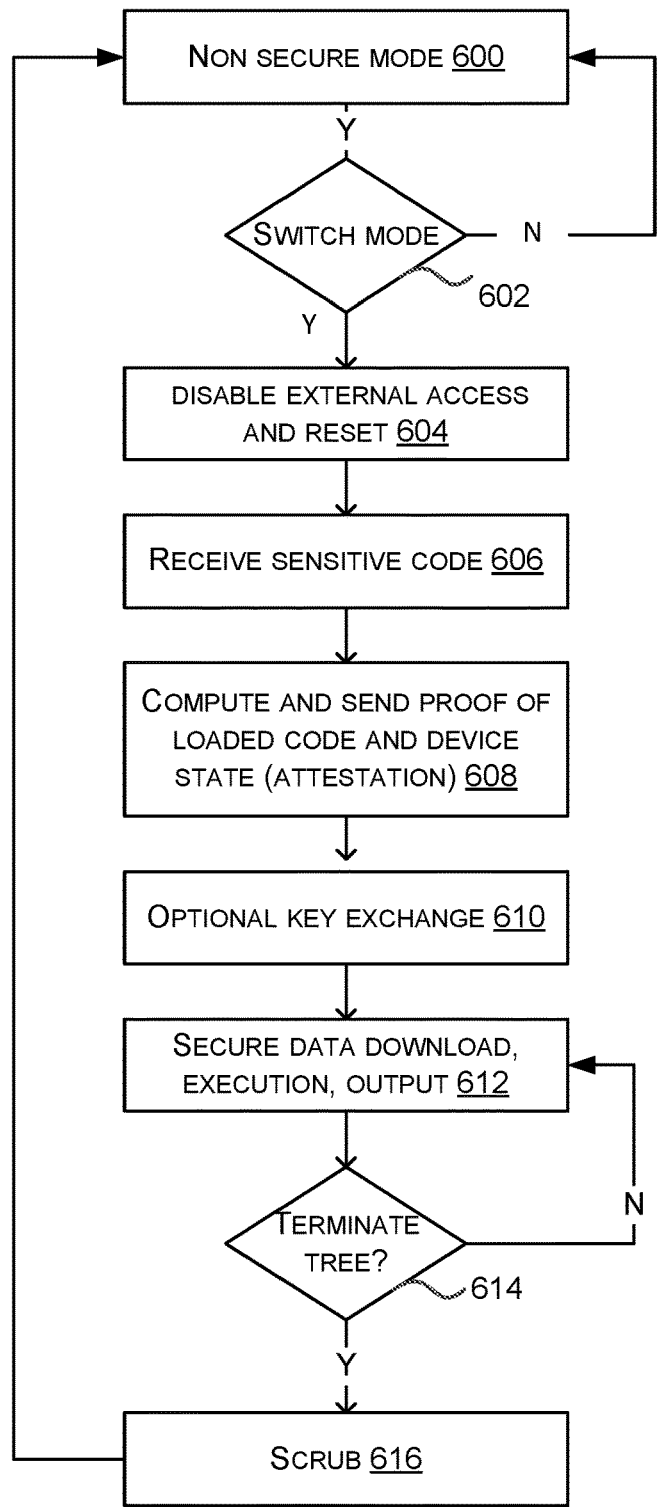
FIG. 6 is a flow diagram of a method of operation at a security module.

An example of a method performed by a security module, such as the security module 120 of FIGS. 1 and 4, is now given with reference to FIG. 6. The peripheral device is in a non-secure mode 600 in which the host device is able to access or tamper with sensitive code and/or sensitive data on the peripheral device. The security module 120 checks 602 whether to switch into a secure mode. If not it remains in the non-secure mode. If the security module 120 receives a command from a tenant to create a TEE it switches into a secure mode.

To switch into the secure mode the security module 120 disables 604 external access to sensitive memory and registers in the peripheral, and places the hardware elements of the peripheral in a known state. In an example the security module 120 disables read/write access to SRAM in the security module 120 over memory-mapped input/output (MMIO). The security module 120 instructs the peripheral to disable access to any security sensitive memory and control registers over MMIO. Access to registers or memory in the security module 120 for correct functioning of the peripheral device is retained in the secure mode where those registers or memory do not hold security sensitive information. Access to those registers or memory is routed to the security module which checks if the accesses are authorized by the tenant. After disabling access over MMIO the security module 120 puts the memory of the peripheral device into a known state, such as by resetting the peripheral device and resetting the memory of the peripheral device by writing zeros.

Once in the secure mode, the security module 120 receives 606 sensitive code from the tenant as described in more detail with reference to FIG. 7. The host is able to request a quote from the security module and provide the quote to the tenant. The quote acts as a certificate issued by the peripheral device for remote attestation in order for the tenant to verify that the sensitive code is installed correctly at the peripheral device.

The security module computes 608 and sends a proof to the tenant. The quote captures security critical properties of the peripheral. In an non-limiting example, the quote is computed as a hash of the security module, debugging mode, and an attribute called the host access flag, signed with the attestation key. The host access flag indicates whether the host has read/write access to tile memory over MMIO. In some examples the quote contains external data such as a hash of a fresh data encryption key generated by the security module and encrypted using the tenant's public key. In another example, the quote contains the hash of a public key that the tenant is able to use to encrypt/wrap a tenant-defined symmetric key and provision to the peripheral device.

Quotes are signed using an attestation key of the peripheral device generated from the peripheral device root of trust. Quotes form the following PKI-like certificate chain:

quote signed using the attestation key;
an attestation key certificate signed using the root endorsement key of the peripheral device;
an endorsement key certificate signed using the root endorsement key of the peripheral device;
a self-signed root endorsement key issuing certificate.

Quotes are verifiable by any entity, such as an attestation service, in possession of the following artifacts:

endorsement key certificates issued by a manufacturer of the peripheral device;
revocation list as applied to the certificates;
current trusted computing base measurements for peripheral device firmware.

The current trusted computing base measurements enable checking if a peripheral device issuing quotes is running the latest version of firmware, and the revocation list is used to check if quotes from the device are invalid due to the device being faulty, decommissioned, compromised or for other reasons.

The security module optionally carries out a key exchange process 610 for embodiments where sensitive data from more than one party is to be processed by the same sensitive code on the peripheral device, or for embodiments where there are multiple tenants using the same peripheral device and with those tenant's code and data being isolated using resource isolation on the peripheral device. The key exchange process is explained in more detail later with reference to FIG. 8.

The security module carries out secure data download 612, execution and output by downloading sensitive data from the tenant, processing the sensitive data on the peripheral device using the sensitive code, and outputting the results to the tenant via the host. In some examples the secure data download involves the tenant encrypting blocks of data and sending the encrypted blocks to the peripheral via the host. In some examples the secure data download involves the tenant encrypting blocks of data, copying the encrypted blocks to the host, and then the peripheral retrieving the encrypted blocks from the host. Any suitable encryption protocol is used. In an example, a particularly efficient encryption protocol is used which is described below with reference to FIG. 9. To output the results to the tenant via the host, the encryption units 118 encrypt blocks of output data and send that to the tenant via the host. In some examples, the encryption protocol of FIG. 9 (which is symmetric) is used both for downloading data to the peripheral device and for sending output results back to the tenant.

The security module checks 614 whether the trusted execution environment is to be terminated. If so the security module scrubs 616 the peripheral device and returns to the non-secure mode 600. When the TEE is explicitly terminated, or the peripheral device receives a reset signal from the host, the security module deletes all sensitive data and returns the peripheral device to a clean state. This includes resetting memory at the peripheral device, deleting any keys, unblocking MMIO accesses and switching to a non-secure mode. If the peripheral device goes through a power cycle, it restarts in a clean state irrespective of the mode it was in.

Figure 7:
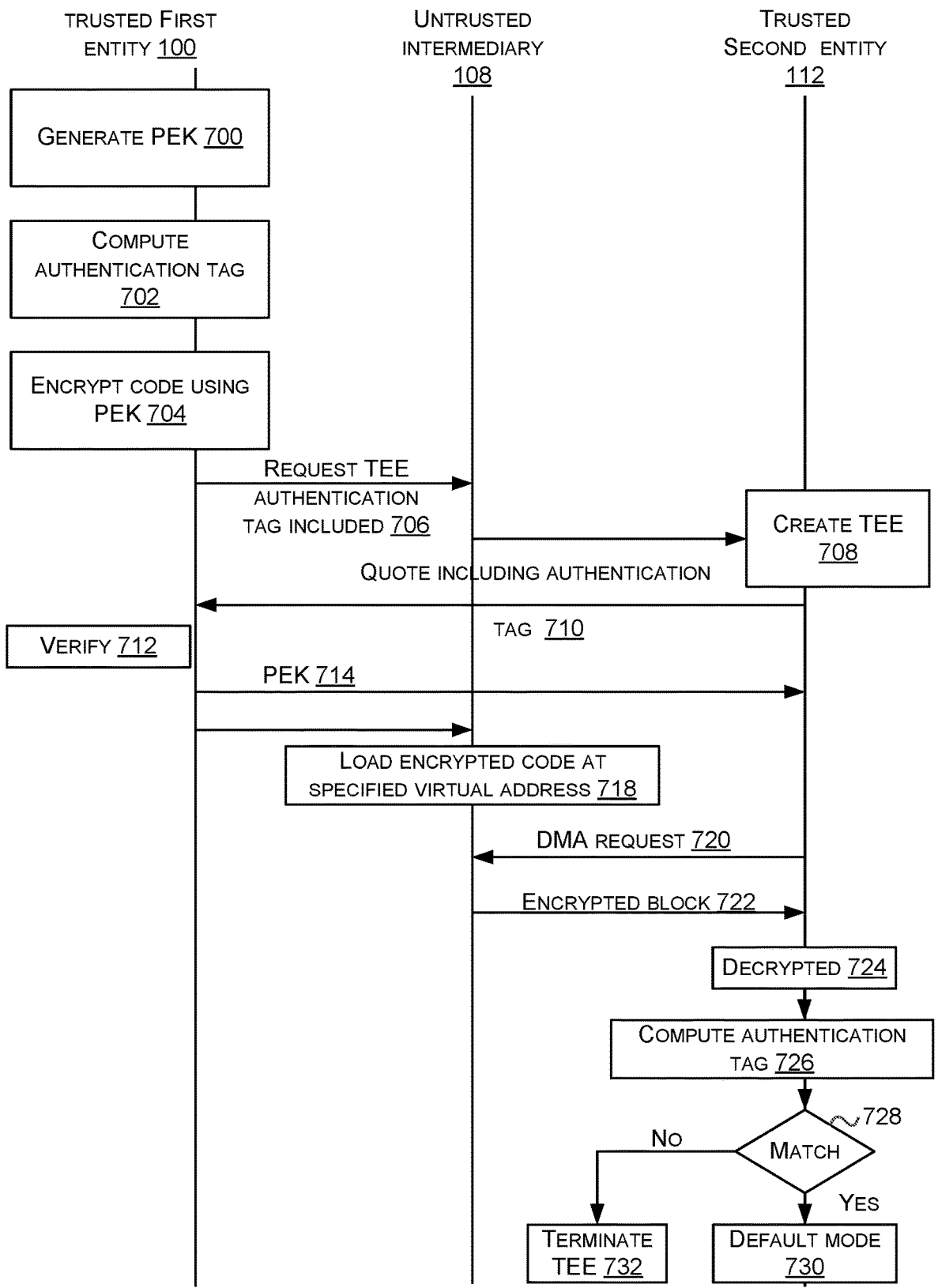
FIG. 7 is a message sequence chart of a remote attestation process.

More detail about the remote attestation process of operation 608 of FIG. 6 is now given with reference to FIG. 7. The remote attestation process has the benefit of using simple hardware as compared with embodiments where the untrusted host copies the sensitive code into peripheral device memory and support is added in the peripheral device memory to measure the contents of the memory when a TEE is created.

FIG. 7 is a message sequence chart showing messages (represented by horizontal arrows) passed between the first trusted entity 100 represented by a vertical line on the left hand side of the figure, an untrusted intermediary 108 represented by a vertical line in the center of the figure, and a second trusted entity 112 represented by a vertical line on the right hand side of the figure. The relative vertical position of the arrows in the figure represents chronological order of the messages.

The first trusted entity 100 (such as the tenant) generates 700 a program encryption key (PEK) for encrypting application code. The tenant has sensitive code to be copied to the peripheral device. The tenant computes an authentication tag 702 over the binary of the sensitive code and it encrypts 704 the sensitive code using the PEK. In some cases the authentication tag is a message authentication code (MAC).

The first trusted entity 100 (such as the tenant) sends a request 706 to the untrusted intermediary 108 to request creation of a TEE at the second trusted entity 112 (such as the peripheral device). The request 706 includes the authentication tag computed over the sensitive code at operation 702. The host forwards the request to create a TEE to the second trusted entity 112 and the second trusted entity (such as the peripheral device) creates the TEE 708 as described above with reference to FIG. 6 operation 604. After TEE creation, a security module of the second trusted entity 112 resets the encryption unit(s) of the peripheral device and switches the security module into a mode where it computes a running authentication tag over all blocks of memory at the peripheral device.

The second trusted entity 112 generates a quote to show that the TEE has been formed and it includes the authentication tag in the quote. The quote including the authentication tag is sent 710 from the second trusted entity 112 to the first trusted entity 100 (tenant for example). The first trusted entity 100 verifies 712 the quote and checks that the authentication tag included in the quote matches the authentication tag computed at operation 702. If verification succeeds, the first trusted entity 100 provisions 714 the PEK to the second trusted entity 112. In an example, the PEK is provisioned 714 to the security module of the second trusted entity by encrypting a symmetric key with the public key included in the quote.

The first trusted entity 100 copies 716 the encrypted code to the untrusted intermediary 108 (such as the host) and the untrusted intermediary 108 loads 718 the encrypted binary at specified virtual addresses of its physical memory.

The second trusted entity 112 issues a DMA request 720 to the untrusted intermediary 108 to copy code from the memory of the untrusted intermediary 108 to memory at the second trusted entity 112. Responses comprising encrypted blocks 722 are received from the untrusted intermediary 108. The response 722 passes through the encryption unit(s) at the second trusted entity 112, which decrypts 724 each block of code and computes 726 an authentication tag over the entire code sequence.

Once DMA requests 720 are complete (to transfer the complete sensitive code) a security module of the second trusted entity 112 checks 726 that the authentication tag of the transferred sensitive code matches the authentication tag specified on TEE creation. If there is a match, the security module of the second trusted entity switches the encryption unit(s) of the second trusted entity 112 into a default mode 730 in which the encryption protocol of FIG. 9 is followed to transfer data between the first trusted entity 100 and the second trusted entity 112. If there is no match the second trusted entity terminates 732 the TEE.

In some examples there is a key exchange process as explained with reference to FIG. 8. A plurality of keys are used when different data streams are encrypted using different keys. For example, input data streams, output data streams and checkpoints may be encrypted using different keys. Checkpoints are intermediate results computed by the sensitive code when it processes the sensitive data, and which are encrypted and stored on the untrusted intermediary. Checkpoints are useful for recovering state and reusing computation. The key exchange process of FIG. 8 has a benefit of not needing programmability of the security module. Programmability of the security module is a facility an adversary may exploit to run arbitrary code on the security module and potentially leak secrets such as attestation keys.

Figure 8:
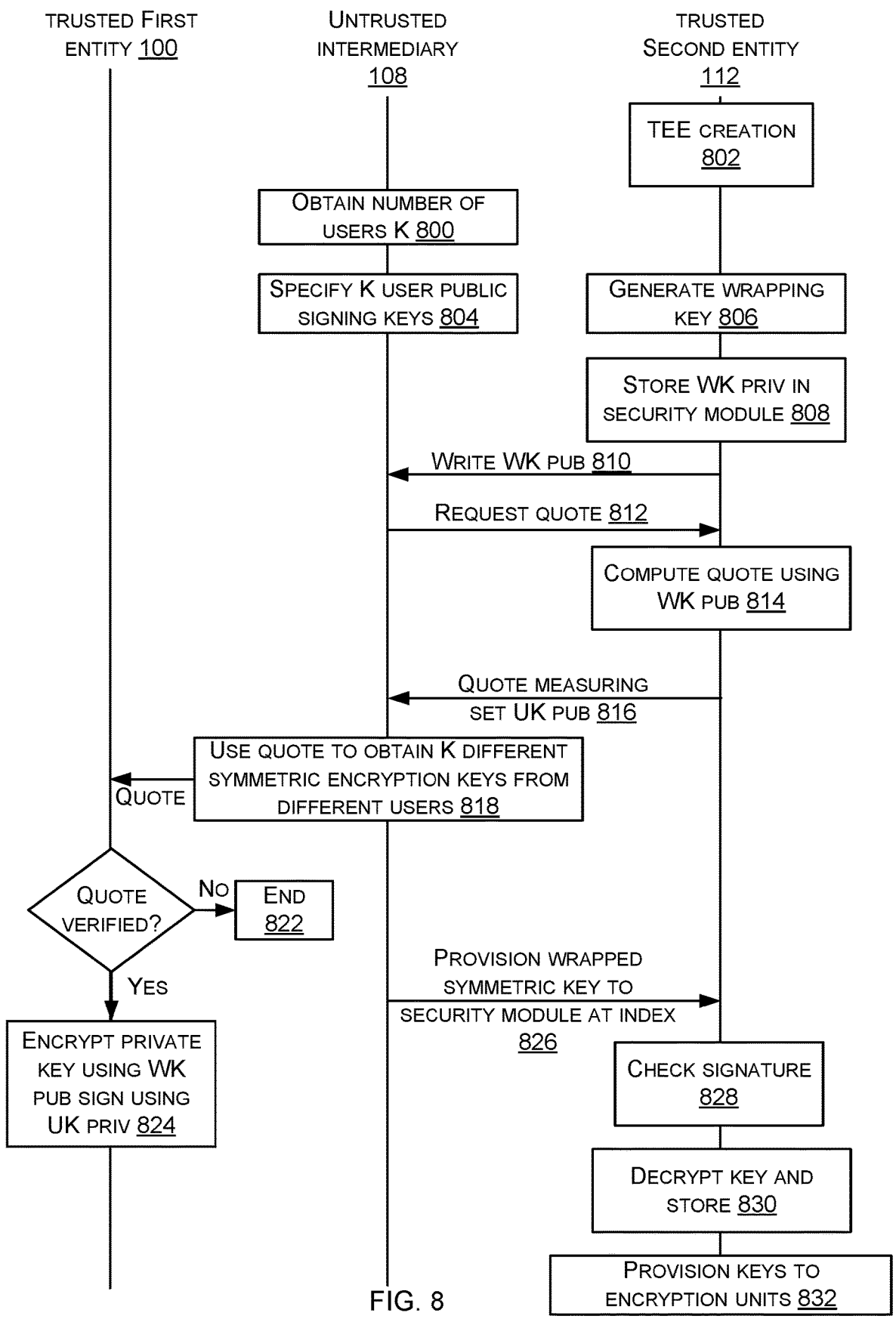
FIG. 8 is a message sequence chart of a method of key exchange.

In an example, the key exchange process of FIG. 8 is a protocol which is built-in to firmware of the security module of the trusted second device 112. One or more key-hierarchies are also built into the firmware of the security module. This gives a balance between crypto-agility and security since protocols and key hierarchies are upgradable by upgrading firmware.

The key exchange process of FIG. 8 securely provisions a set of K symmetric keys DEK_1, . . . DEK_K to each trusted second device 112, where the keys are used for different data streams.

The trusted second entity 112 creates 802 a TEE. The untrusted intermediary 108 (host for example) obtains 800 a number of users K and specifies 804 K user public signing keys denoted UKpub_1, . . . UKPub_K, where each public key belongs to a participating user (such as a data stream or a tenant). In response, a security module of the trusted second entity 112 generates 806 a fresh key pair called a wrapping key (WK) on TEE creation, stores 808 WKpriv securely in secure volatile storage in the security module and writes 810 the public key WKpub to memory at the untrusted intermediary 108. When the untrusted intermediary 108 requests 812 for a quote, the quote is computed 814 over WKpub and contains a measurement of the set of public keys UKpub. The quote is computed by the trusted second entity 112 and is sent to the untrusted intermediary using message 816. The untrusted intermediary 108 uses 818 the quote to retrieve K different symmetric encryption keys from different users of key management service accounts. The users/key management service receive the quote and verify 820 the quote. If the quote is not valid the process ends 822. If the quote is valid, the trusted first entity 100 encrypts 824 the private key using WKpub and signs the result using its UKpriv. This ensures that the private key is only decrypted by the security module. The untrusted intermediary 108 then provisions 826 the wrapped symmetric key to the security module at an index j\in (1, K). The security module checks 828 the signature of the encrypted key using UKpub_j. If the signature verification succeeds, it decrypts 830 the key and stores the key in a map. Once all K symmetric keys have been deployed, the security module provisions 832 these keys to the encryption unit(s).

FIG. 9 is a message sequence chart of an encryption protocol used by the trusted first entity 100 and the trusted second entity 112 of FIG. 1 in some examples. The trusted first entity 100 and the trusted second entity 112 pre-agree 900 that initialization vectors of the encryption protocol will be used only once for an encryption key and data set; that is, they agree on single use of initialization vectors. The trusted first entity 100 and the trusted second entity 112 also pre-agree a parameterized function for obtaining initialization vectors. In some embodiments the parameterized function takes a single parameter which is a virtual address, and the function is the identity function so that the virtual address is used as the initialization vector. In other embodiments the parameterized function takes parameters such as program state. The parameterized function computes on one or more of: a virtual address, a key, a counter. Thus it is not essential for the parameterized function to be the identity function. Because the trusted first entity 100 and the trusted second entity 112 have pre-agreed a function to obtain initialization vectors, the protocol is extremely efficient since no complex scheme for managing the initialization vectors, ensuring they are unique, and transferring them between the trusted first entity 100 and the trusted second entity 112 is needed. The initialization vectors and keys are computed from the parameterized function before encryption 904 and decryption 914 operations as now explained with reference to FIG. 9.

The trusted first entity 100 divides the sensitive information to be transferred to the trusted second entity 112 into a plurality of blocks. It encrypts the blocks 904 using initialization vectors and keys. An individual block is encrypted using a pair comprising an initialization vector and a key. Because of the pre-agreement regarding single use of initialization vectors, an individual block is encrypted using a unique pair. In this way the encryption is secure. In contrast, if initialization vectors are used more than once, there is a risk of a malicious party obtaining the sensitive data or compromising the integrity of the computation, e.g., by replacing a data sample with another one encrypted with the same initialization vector.

The trusted first entity copies 906 the encrypted blocks to memory at the untrusted intermediary 108. The untrusted intermediary 108 stores the encrypted blocks in its physical memory and the physical memory locations of the blocks have virtual addresses according to a mapping between physical and virtual memory locations. The potential available virtual addresses is extremely large since their domain is large enough to enable the sensitive code to run large computations while still using every virtual address only once.

The trusted second entity 112 comprises at least one encryption unit 118 and at least one compute unit 114. The compute unit 114, when it begins executing code to process the data in the encrypted blocks, requests a block from the untrusted intermediary 108 using a DMA request 910 and parameters of the pre-agreed function. The untrusted intermediary 108 receives the request 910 and it computes the initialization vector of the block that is being requested. The untrusted intermediary looks in its memory to find the appropriate encrypted block from the trusted first entity 100 and retrieves the appropriate encrypted block.

The encryption unit 118 at the trusted second entity decrypts 914 the retrieved block and sends the result to the compute unit 114. The compute unit knows the original initialization vector associated with the request it made at operation 910. The compute unit is able to check the result it receives from the decryption is expected in view of the initialization vector from operation 910. If the check is passed the compute unit 114 proceeds to use the decrypted data; otherwise it rejects the decrypted data.

As mentioned above, in some cases the pre-agreed function is such that the virtual address of an encrypted block at the untrusted intermediary 108 is the initialization vector. In this case, the trusted first entity 100 uses the virtual address of a block as the initialization vector when encrypting that block, and never reuses the same virtual address to encrypt another block with the same key. This guarantees that there is just one block encrypted with the same initialization vector and key. The trusted second entity 112 uses the virtual address of a block as the initialization vector while encrypting the block before writing it to the untrusted intermediary 108. The application running on the trusted second entity 112 is configured to not reuse the same virtual address for writing two different blocks of data.

A benefit of using the virtual address as an initialization vector is that an application running on the compute unit 114 is an oracle for blocks of data to be read and written. The sequence of addresses generated by an application targeting the virtual address space uniquely defines the sequence of blocks to be read from the host. The combination of checking the authenticity of input blocks followed by a check to ensure that the initialization vector included in a block's header matches the virtual address suffices to guarantee integrity of input data streams. Authentication and initialization vector checks are sufficient to guarantee integrity of the output stream.

In some examples the protocol of FIG. 9 also derives encryption key identifiers from virtual addresses. The virtual address space at the untrusted intermediary 108 is partitioned into K regions. In an example, some but not all of the bits of the virtual address are used as a key identifier. The key identifier is used to lookup a list of keys which have been provisioned to a security module of the trusted second entity during a key exchange process such as the key exchange process of FIG. 8. The encryption unit 118 at the trusted second entity 112 expects blocks with the same bits to be encrypted using the same encryption key. An encryptor at the trusted first entity 100 encrypts blocks with the same bits with the same key.

In some examples the trusted first entity 100, for each encrypted block, places a header containing an authentication tag and an initialization vector in a data stream following a block. The data stream is formed from a sequence of blocks of data to be copied from the trusted first entity 100 to the untrusted intermediary 108. Using a header holding the authentication tag and initialization vector ensures that tags, initialization vectors and data are read and written together as part of a same DMA request. The trusted second entity 112, using the headers, is able to authenticate any block of data it receives, and is able to authenticate and decrypt multiple blocks in parallel in embodiments where buffer 406 is used. Where the buffer 406 is omitted, the authentication and decryption of blocks occurs one by one. Any suitable component of the peripheral device is arranged to take into account additional space used by headers (such as when the peripheral generates DMA requests). Any suitable component of the peripheral device is arranged to take into account that data returned from the untrusted intermediary 108 in response to DMA requests will be less than the requested size. The trusted second entity 112 checks the initialization vector included in the header before using the data.

The buffer 406 (in the security module) is arranged to intercept and buffer DMA requests and responses as mentioned above and pass them to the encryption/decryption component 402.

In some examples the buffer 406 stores DMA responses until an entire DMA response is ready to be decrypted. This reduces complexity at the encryption/decryption unit 402 since complex state for multiple inbound responses does not need to be maintained. The buffer 406 is not needed where it is possible to guarantee that there are no externally observable side effects from the peripheral device processing incorrect data while a DMA response is in flight. This is achieved by providing a barrier such that no outbound DMAs are issued until all in-bound DMA responses have arrived.

In some examples, in addition to (or instead of) storing DMA responses until an entire DMA response is ready to be decrypted, the buffer maps from request to initialization vector as now described. For DMA write requests the buffer extracts the initialization vector from the outbound write request and uses it to retrieve the encryption key from the key storage. The buffer then routes the payload along with the initialization vector and the key to the encryption/decryption component 402. The buffer 406 uses the encrypted payload, the authentication tag and the initialization vector, to construct a new payload request which is sent to the untrusted intermediary 108.

Decrypting DMA responses from host memory to peripheral device memory is extremely challenging for three reasons: first, DMA responses from the host are sometimes split into multiple blocks; second, it is possible to have multiple DMA requests in flight at any point in time; and third, DMA responses do not contain the key identifier.

The buffer 406 maintains a small amount of state in the peripheral device for every DMA request. The buffer 406 extracts the key identifier and the destination address from each outgoing read request and stores the key identifier and destination address pairs in a map that tracks pairs of source and destination addresses and DMA size. When a first DMA response for a request is received, the buffer 406 looks up the source initialization vector address (IVA) using the destination address. It uses the source initialization vector address to retrieve the encryption key. It creates a new context in the encryption unit 118 and forwards the encryption key, the initialization vector (obtained by expanding the IVA), and the encrypted payload. It forwards subsequence DMA responses to the encryption unit 118. If authentication and decryption succeed, the buffer 406 forwards the response to the compute elements 114. The buffer 406 stops tracking requests once an entire response for a request has been received.

The encryption unit 118 has a key store, such as a block of SRAM or a register file, to hold encryption keys. The keys are stored in a map that is indexed using high-order bits from the initialization vector address. The mapping is provisioned by the security module after key exchange.

Figure 10:
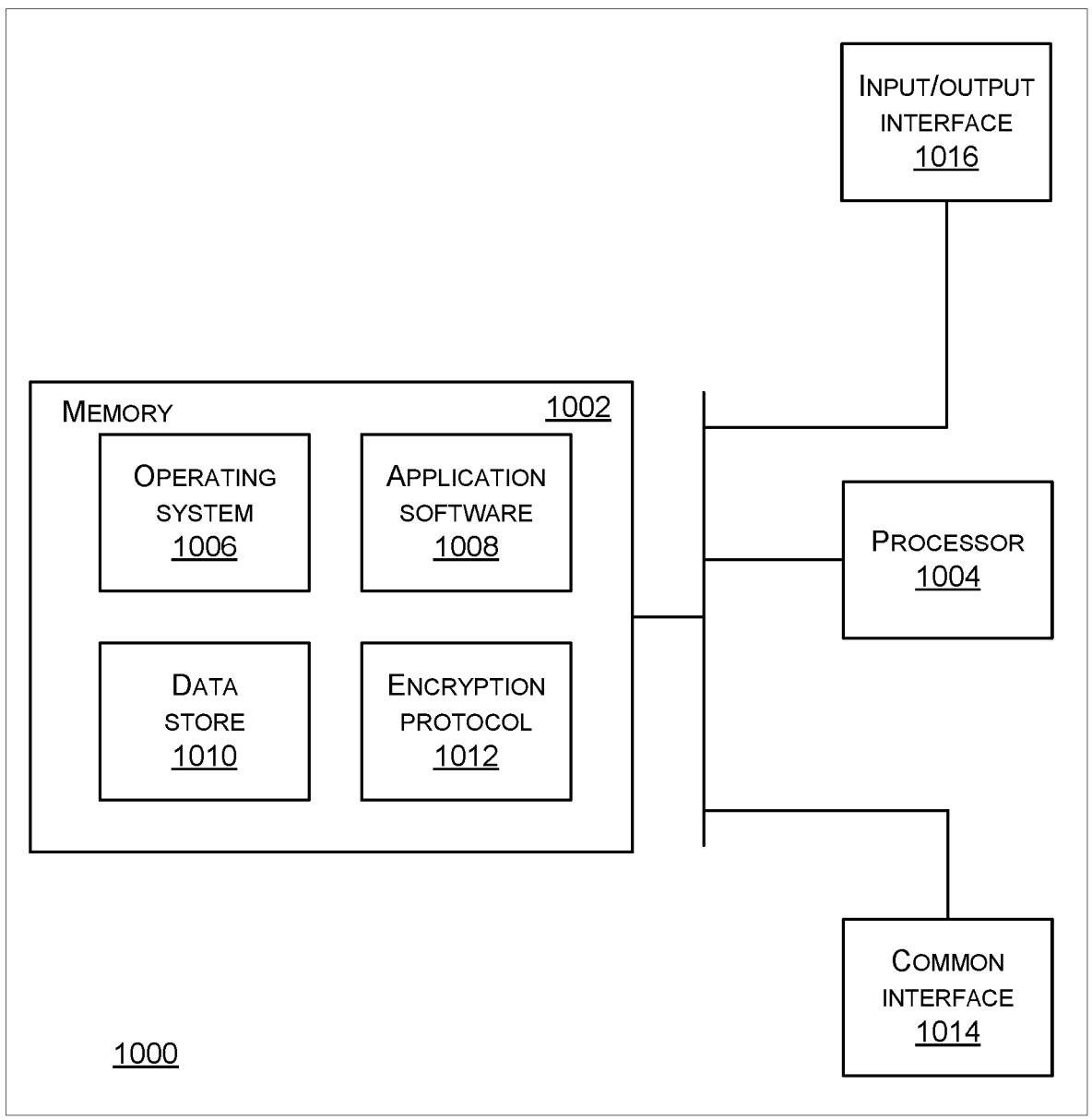
FIG. 10 is a schematic diagram of a computing-based device in which embodiments of a first trusted computing entity, or a host are implemented.

FIG. 10 illustrates various components of an exemplary computing-based device 1000 which are implemented as any form of a computing and/or electronic device, and in which embodiments of an untrusted intermediary, or a first trusted computing entity are implemented in some examples.

Computing-based device 1000 comprises one or more processors 1004 which are microprocessors, controllers or any other suitable type of processors for processing computer executable instructions to control the operation of the device in order to implement an encryption protocol, or to host a peripheral device. In some examples, for example where a system on a chip architecture is used, the processors 1004 include one or more fixed function blocks (also referred to as accelerators) which implement a part of the method of FIG. 9 in hardware (rather than software or firmware). Platform software comprising an operating system 1006 or any other suitable platform software is provided at the computing-based device to enable application software 1008 to be executed on the device. A data store 1010 holds initialization vectors, keys, blocks of encrypted data, or other information. An encryption protocol 1012 is stored in memory 1002 in the case that the computing-based device 1000 is the first trusted computing entity of FIG. 1.

The computer executable instructions are provided using any computer-readable media that is accessible by computing based device 1000. Computer-readable media includes, for example, computer storage media such as memory 1002 and communications media. Computer storage media, such as memory 1002, includes volatile and non-volatile, removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 1002) is shown within the computing-based device 1000 it will be appreciated that the storage is, in some examples, distributed or located remotely and accessed via a network or other communication link (e.g. using communication interface 1014).

In the case that the computing-based device is the first trusted computing entity, the communication interface 1014 enables the computing-based device 1000 to communicate with an untrusted intermediary such as that of FIG. 1. In the case that the computing-based device 1000 is an untrusted intermediary a peripheral device such as that of FIG. 4 is hosted by the computing-based device 1000.

The computing-based device 1000 also comprises an input/output interface 1016 arranged to output display information to a display device which may be separate from or integral to the computing-based device. The display information may provide a graphical user interface. The input/output interface 1016 is also arranged to receive and process input from one or more devices, such as a user input device (e.g. a mouse, keyboard, camera, microphone or other sensor).

The technology encompasses any combination of the following examples:

A peripheral device for use with a host computing device, the peripheral device comprising:
  one or more compute elements;
  a security module configured to form a trusted execution environment on the peripheral device for processing sensitive data using sensitive code, wherein the sensitive data and sensitive code are provided by a trusted computing entity which is in communication with the host computing device;
  at least one encryption unit configured to encrypt and decrypt data transferred between the trusted execution environment and the trusted computing entity via the host computing device;
  the security module configured to compute and send an attestation to the trusted computing entity to attest that the sensitive code is in the trusted execution environment.

By having the encryption unit on the peripheral device, rather than on the host, it is possible to securely and efficiently decrypt the sensitive data as it is received from the trusted entity to be processed by the sensitive code. The encryption unit also securely and efficiently encrypts outputs of the sensitive code before these are sent to the host and/or trusted computing entity. How to deploy the encryption unit on the peripheral device rather than the host is not straight forward because there is to be ability to have a trusted execution environment on the peripheral device and ability to switch between a trusted and non-trusted mode of operation of the peripheral device.

The peripheral device described above wherein the data transferred between the trusted execution environment and the trusted computing entity, is transferred using direct memory access requests and responses. This provides an efficient and effective way to transfer data.

The peripheral device described above wherein the security module is configured to form the trusted execution environment by switching the peripheral device from a non-secure mode in which access to memory and registers of the peripheral via a linear address space is possible, into a secure mode in which access to specified memory and specified registers of the peripheral via the linear address space is disabled. The linear address space is shared or partially shared in some cases. In some cases the linear address space is implemented using memory-mapped input-output. By having a secure mode of operation and a non-secure mode of operation the peripheral device is versatile. The secure mode of operation restricts some of the functionality of the peripheral device and is typically more resource intensive than the non-secure mode. Therefore the ability to switch between modes enables the secure mode to be used only when needed. However, note that the non-secure mode of operation is omitted in some examples and in that case, there is no mode switch between a secure mode of operation and a non-secure mode of operation.

The peripheral device described above wherein the security module is configured to switch the peripheral device into the secure mode in response to a request from the host device. In this way the host device is able to create a trusted execution environment on the peripheral as and when wanted, using a simple request. The peripheral device as described above wherein the security module is configured to exchange keys with the first trusted computing entity, and to provision keys provided by the first trusted computing entity to the at least one encryption unit. Exchanging and provisioning keys in this way facilitates the ability to have secure communications between the peripheral device and the first trusted computing entity.

The peripheral device described above wherein the security module is configured such that, when the peripheral device is in the secure mode, if a request is received from the host for a quote, the security module computes and returns a quote capturing security critical properties of the peripheral device to the host. In this way the peripheral device is able to attest to security critical properties in a simple and efficient manner.

The peripheral device described above wherein the security module is configured to compute the attestation by computing a quote which is a hash of: the security module and additionally zero or more of: a debugging mode, a host access flag, a hash of a fresh data encryption key generated by the security module and encrypted using a public key of the trusted computing entity. In this way a quote is computed which gives an accurate indication of properties of the peripheral. The quote enables a potentially remote entity to verify the state of the peripheral device before deciding whether to trust it.

The peripheral device described above wherein the security module is configured to compute the attestation by computing a quote comprising a certificate which follows a certificate chain comprising: a quote signed using an attestation key, an attestation key certificate signed by an endorsement key, an endorsement key certificate signed using a root key, a self-signed root endorsement key issuing certificate. By using a certificate which follows a certificate chain security is enhanced.

The peripheral device described above wherein the encryption unit comprises a key store, a buffer and an encryption/decryption component. This is a simple and yet effective design for the encryption unit which is compact.

The peripheral device described above wherein the buffer is configured to intercept and buffer direct memory access requests and responses sent between the trusted execution environment and the host. By buffering requests and responses it is possible to control a rate of operation of the encryption/decryption unit.

The peripheral device described above wherein the buffer is configured to, when it intercepts a direct memory access write request, to extract an initialization vector from the direct memory access write request and use the initialization vector to retrieve an encryption key from the key store. This facilitates efficient key exchange.

The peripheral device described above wherein the buffer is configured to route a payload of the direct memory access write request, together with the initialization vector and the retrieved encryption key, to the encryption/decryption component. In this way the encryption/decryption component has the items for encryption or decryption.

The peripheral device described above formed as a package wherein the security module is on-die with the one or more compute elements, or off a die of the one or more compute elements. The on-die option gives enhanced security but is complex to manufacture. The off-die option gives more flexibility in the design, test and manufacture of the peripheral device. In some cases the peripheral device is on package and in some cases it is off package. The on package option gives more security.

The peripheral device described above formed as a plurality of connected packages. In this case manufacturing costs increase as two packages are formed, but the design, test and manufacture is simplified due to the use of two packages. Forming the peripheral device as a plurality of packages gives enhanced security as compared with using an off-package arrangement.

The peripheral device described above wherein the encryption unit has a plurality of keys so as to encrypt different data streams with different keys, and where the encryption unit is provisioned with the plurality of keys using a key exchange process. Using different keys in this way enables sensitive data from more than one source to be processed by sensitive code at the peripheral device.

The peripheral device described above wherein the security module is configured to isolate resources of the peripheral device to create secure channels on the peripheral device, and where different encryption keys are used for different secure channels. Where resource isolation is available on the peripheral it is possible to have multiple tenants using resources of the same peripheral and to keep the respective tenants' work separate.

The peripheral device described above wherein the security module is configured to compute, as part of the key exchange process, a quote containing a measurement of a plurality of public keys, the public keys having been specified by the host computing device. The quote is an efficient way to facilitate key exchange.

The peripheral device described above wherein the security module is configured to receive encrypted private keys from an entity which has verified the quote.

The peripheral device described above wherein the at least one encryption unit and the trusted computing entity are configured to use an encryption protocol which encrypts blocks of data, each block being encrypted using a pair comprising a key and an initialization vector, and where the encryption unit and the trusted computing entity agree to use each initialization vector only once with a given key; and wherein the initialization vectors are computed from a parameterized function known to the encryption unit and the trusted computing entity.

A peripheral device for use with a host computing device, the peripheral device comprising:
one or more compute elements;
a security module configured to form a trusted execution environment on the peripheral device for processing sensitive data using sensitive code, wherein the sensitive data and sensitive code are provided by a trusted computing entity which is in communication with the host computing device;
at least one encryption unit configured to encrypt and decrypt data transferred between the trusted execution environment and the trusted computing entity via the host computing device;
the encryption unit configured to use an encryption protocol where initialization vectors are computed from a parameterized function known to the encryption unit and the trusted computing entity. Using the parameterized function gives a particularly efficient way of managing the initialization vectors to ensure that each initialization vector is only used once with a given key.

A data center comprising:
a plurality of compute nodes, each compute node comprising a host computing device having at least one peripheral device, the peripheral device comprising:
one or more compute elements;
a security module configured to form a trusted execution environment on the peripheral device for processing sensitive data using sensitive code, wherein the sensitive data and sensitive code are provided by a trusted computing entity which is in communication with the host computing device;
at least one encryption unit configured to encrypt and decrypt data transferred between the trusted execution environment and the trusted computing entity via the host computing device. The resulting data center gives significant compute capacity as a result of the peripheral devices and it enables sensitive code and data to be processed on the peripheral devices on behalf of tenants, even though the sensitive code and data passes to the peripheral device via an untrusted host. In some examples, a single trusted execution environment may be formed across a plurality of peripheral devices of the host computing device. The plurality of peripheral devices may be an arbitrary sub-set of the peripheral devices of the host computing devices.

A method for securely transferring data between a first trusted computing entity and a second trusted computing entity via an untrusted intermediary, the method comprising:

encrypting blocks of the data at the first trusted computing entity using, for each block, a pair comprising a key and an initialization vector;

having the first trusted computing entity pre-agree with the second trusted computing entity that initialization vectors are to be used only once;

storing at the first trusted computing entity a parameterized function for obtaining the initialization vectors, the parameterized function being known to the second trusted computing entity;

copying the encrypted blocks of data from the first trusted computing entity to a virtual address space of the untrusted intermediary such that the second trusted computing entity is able to retrieve the blocks by making direct memory access requests.

The method as described above where the virtual address space is targeted by code installed in a trusted execution environment at the second trusted computing entity.

The method as described above where the parameterized function is an identity function so that the virtual address is the initialization vector.

The method as described above where at least one parameter of the parameterized function comprises program state of code installed in a trusted execution environment at the second trusted computing entity.

The method as described above where the second trusted computing entity comprises an encryption unit and a compute unit.

The method as described above wherein a virtual address of a block is used as the initialization vector.

The method as described above where the first trusted computing entity, for each encrypted block, places a header comprising an authentication tag and an initialization vector in a data stream following a block.

The method as described above comprising, at the second trusted computing entity, receiving for each encrypted block, a header and using the header to authenticate the block.

The method as described above comprising, at the second trusted computing entity, authenticating and decrypting multiple blocks in parallel.

The method as described above comprising taking into account, at the second trusted computing entity, additional space used by headers when generating direct memory access requests.

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The invention claimed is:

1. A device comprising:
   a processor;
   an encryptor; and
   a memory storing at least a part of a first initialization vector associated with data in storage external to the processor, the first initialization vector being for a single use, and comprising virtual addresses of blocks of the data;
   the processor being configured to execute computer readable instructions to cause issuance of a read request for the data in the storage external to the processor; and
   the encryptor being configured to:
      receive a read completion corresponding to the read request, the read completion comprising encrypted text and a second initialization vector;
      decrypt the encrypted text using the second initialization vector to produce plaintext; and
      provide the plaintext and at least a part of the second initialization vector to the processor;
   the processor being configured to:
      compare at least a part of the first initialization vector to the at least a part of the second initialization vector; and
      in response to determining that the at least a part of the first initialization vector matches the at least a part of the second initialization vector, accept the plaintext.

2. The device of claim 1, wherein
   the processor is part of a subsystem for acting as a work accelerator to a host system coupled to the device, and
   wherein the storage external to the processor is a memory of the host system.

3. The device of claim 2, the processor being further configured to receive, from the host system, at least part of the computer readable instructions.

4. The device of claim 1, wherein the storage external to the processor is external to a processing unit comprising the processor.

5. The device of claim 1, wherein the storage external to the processor is a dynamic random access memory.

6. The device of claim 1, further comprising another processor configured to, prior to the issuance of the read request, execute computer readable instructions to cause issuance of a write request of the data to the storage external to the processor, the write request comprising the plaintext and at least a part of the first initialization vector;
   the encryptor being further configured to:
   receive the write request;
   encrypt the plaintext of the write request using the first initialization vector to produce the encrypted text; and
   cause the encrypted text and the first initialization vector to be written to the storage external to the processor.

7. The device of claim 1, wherein the decryption of the encrypted text using the second initialization vector is performed according to an advanced encryption standard.

8. The device of claim 1, wherein the read completion corresponding to the read request is received via a buffer, the buffer causing one read completion being in flight while another read completion is received via the buffer.

9. A method implemented in a device comprising a processor, the method comprising:
   issuing a write request to an encryptor;
   based on the issued write request, receiving, at the encryptor, the write request of data to storage external to the processor, the write request comprising a plaintext and at least part of a first initialization vector, wherein the first initialization vector is single use;
   encrypting the plaintext of the write request using the first initialization vector to produce encrypted text;
   causing the encrypted text and the first initialization vector to be written to the storage external to the processor;
   causing issuance of a read request for the data in the storage external to the processor;
   receiving, by the encryptor, a read completion corresponding to the read request, the read completion comprising the encrypted text and a second initialization vector;
   decrypting the encrypted text using the second initialization vector to produce the plaintext;
   providing the plaintext and at least part of the second initialization vector to the processor;
   comparing, at the processor, the at least a part of the first initialization vector to the at least a part of the second initialization vector; and
   in response to determining that the at least a part of the first initialization vector matches the at least part a of the second initialization vector, accepting the plaintext.

10. The method of claim 9, the processor being part of a subsystem for acting as a work accelerator to a host system coupled to the device, and the storage external to the processor being a memory of the host system.

11. The method of claim 9, wherein the storage external to the processor is external to a processing unit comprising the processor.

12. The method of claim 9, wherein the storage external to the processor is a dynamic random access memory.

13. The method of claim 9, further comprising computing, at the processor, the first initialization vector from a parameterized function.

14. The method of claim 13, wherein the parameterized function produces different pairwise-distinct initialization vectors for different portions of the plaintext.

15. A computer program for execution by a processor of a device to perform a method, the method comprising:
   storing, in the processor, at least a part of a first initialization vector associated with data in storage external to the processor, the first initialization vector being for a single use, and comprising virtual addresses of blocks of the data;
   causing issuance of a read request for the data in the storage external to the processor;
   receiving, by an encryptor, a read completion corresponding to the read request, the read completion comprising a plaintext and at least a part of a second initialization vector;
   comparing at least a part of the first initialization vector to the at least a part of the second initialization vector; and
   in response to determining that the at least a part of the first initialization vector matches the at least a part of the second initialization vector, accepting the received plaintext.

16. The computer program of claim 15, further comprising the processor being part of a subsystem for acting as a work accelerator to a host system coupled to the device, and the storage external to the processor being a memory of the host system.

17. The computer program of claim 16, the processor being further configured to receive, from the host system, at least part of the computer program.

18. The computer program of claim 15, further comprising the storage external to the processor being a memory external to the processor.

19. The computer program of claim 15, wherein the storage external to the processor is a dynamic random access memory.

\* \* \* \* \*